United States Patent
Cennamo et al.

(10) Patent No.: US 12,412,400 B2
(45) Date of Patent: Sep. 9, 2025

(54) OBJECT DETECTION IN A VEHICLE

(71) Applicant: Aptiv Technologies AG, Schaffhausen (CH)

(72) Inventors: Alessandro Cennamo, Wuppertal (DE); Florian Kaestner, Bochum (DE)

(73) Assignee: Aptiv Technologies AG, Schaffhausen (CH)

( * ) Notice: Subject to any disclaimer, the term of this patent is extended or adjusted under 35 U.S.C. 154(b) by 361 days.

(21) Appl. No.: 17/823,557

(22) Filed: Aug. 31, 2022

(65) Prior Publication Data

US 2023/0078046 A1 Mar. 16, 2023

(30) Foreign Application Priority Data

Sep. 10, 2021 (EP) ..................... 21195945

(51) Int. Cl.
*G06V 20/58* (2022.01)
*B60W 40/10* (2012.01)

(52) U.S. Cl.
CPC ............. *G06V 20/58* (2022.01); *B60W 40/10* (2013.01); *B60W 2420/408* (2024.01); *B60W 2554/4049* (2020.02)

(58) Field of Classification Search
None
See application file for complete search history.

(56) References Cited

U.S. PATENT DOCUMENTS 10,678,253 B2 * 6/2020 Zeng ..................... B60W 50/14
2018/0211128 A1 7/2018 Hotson et al.
(Continued)

FOREIGN PATENT DOCUMENTS

EP 3832341 6/2021
WO 2016156236 10/2016
(Continued)

OTHER PUBLICATIONS

Huang, Rui, et al. "An lstm approach to temporal 3d object detection in lidar point clouds." Computer Vision—ECCV 2020: 16th European Conference, Glasgow, UK, Aug. 23-28, 2020, Proceedings, Part XVIII 16. Springer International Publishing, 2020. (Year: 2020).*

(Continued)

*Primary Examiner* — Michelle M Entezari Hausmann
(74) *Attorney, Agent, or Firm* — Harness, Dickey & Pierce, P.L.C.

(57) ABSTRACT

The present disclosure provides systems and techniques directed at object detection in a vehicle. In aspects, techniques include capturing current radar image data. The current radar image data includes at least one current point cloud. The current point cloud includes at least one current object point being related to an object, and each current object point includes spatial information related to the object. The techniques further include retrieving previous radar image data. The previous radar image data includes at least one previous point cloud. The previous point cloud includes at least one previous object point being related to the object, and each previous object point includes spatial information related to the object. The techniques further include concatenating the information from the current radar image data and the information from the previous radar image data to derive enhanced radar image data using a recurrent neural network.

14 Claims, 3 Drawing Sheets

(56) References Cited

U.S. PATENT DOCUMENTS

| | | | |
|---|---|---|---|
| 2020/0003886 A1* | 1/2020 | Cho | G01S 13/588 |
| 2020/0082248 A1 | 3/2020 | Villegas et al. | |
| 2020/0126191 A1* | 4/2020 | Munkberg | G06T 5/70 |
| 2021/0009166 A1* | 1/2021 | Li | G06F 16/909 |
| 2021/0018615 A1* | 1/2021 | Su | G01S 13/726 |
| 2022/0120858 A1 | 4/2022 | Cennamo et al. | |
| 2022/0188582 A1* | 6/2022 | Zhu | G06F 18/253 |
| 2022/0319054 A1* | 10/2022 | Abdo | G06N 3/0464 |
| 2023/0014245 A1* | 1/2023 | Munkberg | G06T 5/60 |
| 2023/0394294 A1* | 12/2023 | Chiu | G06N 3/092 |
| 2024/0123987 A1* | 4/2024 | Wang | B60W 50/0097 |

FOREIGN PATENT DOCUMENTS

| | | |
|---|---|---|
| WO | 2019060125 | 3/2019 |
| WO | 2020113160 | 6/2020 |

OTHER PUBLICATIONS

Filatov, Artem, Andrey Rykov, and Viacheslav Murashkin. "Any motion detector: Learning class-agnostic scene dynamics from a sequence of lidar point clouds." 2020 IEEE international conference on robotics and automation (ICRA). IEEE, 2020. (Year: 2020).*
Zhu, Simin, Alexander Yarovoy, and Francesco Fioranelli. "DeepEgo: Deep instantaneous ego-motion estimation using automotive radar." IEEE Transactions on Radar Systems 1 (2023): 166-180. (Year: 2023).*
Hassan, Mujtaba, et al. "NN-Based Instantaneous Target Velocity Estimation Using Automotive Radar." IEEE Sensors Journal (2025). (Year: 2025).*
Harlow, Kyle, et al. "A new wave in robotics: Survey on recent mmwave radar applications in robotics." IEEE Transactions on Robotics (2024). (Year: 2024).*
Kim, Youngseok, Jun Won Choi, and Dongsuk Kum. "Grif net: Gated region of interest fusion network for robust 3d object detection from radar point cloud and monocular image." 2020 IEEE/RSJ International Conference on Intelligent Robots and Systems (IROS). IEEE, 2020. (Year: 2020).*
Zhu, Simin, et al. "DeepEgo+: Unsynchronized Radar Sensor Fusion for Robust Vehicle Ego-Motion Estimation." IEEE Transactions on Radar Systems (2025). (Year: 2025).*
Yin, Junbo, et al. "Graph neural network and spatiotemporal transformer attention for 3D video object detection from point clouds." IEEE Transactions on Pattern Analysis and Machine Intelligence 45.8 (2021): 9822-9835. (Year: 2021).*
"Extended European Search Report", EP Application No. 21195945. 7, Mar. 3, 2022, 10 pages.
"Extended European Search Report", EP Application No. 20202567. 2, Apr. 15, 2021, 16 pages.
Chen, et al., "3D Point Cloud Processing and Learning for Autonomous Driving", Mar. 1, 2020, 27 pages.
Danzer, et al., "2D Car Detection in Radar Data with PointNets", 2019 IEEE Intelligent Transportation Systems Conference (ITSC), Dec. 2, 2019, 7 pages.
Fan, et al., "PointRNN: Point Recurrent Neural Network for Moving Point Cloud Processing", Nov. 24, 2019, 15 pages.
Qi, et al., "Frustum PointNets for 3D Object Detection from RGB-D Data", Apr. 13, 2018, 10 pages.
Qi, et al., "PointNet: Deep Learning on Point Sets for 3D Classification and Segmentation", Conference on Computer Vision and Pattern Recognition (CVPR) 2017, Jul. 2017, pp. 652-660.
Qi, et al., "PointNet++: Deep Hierarchical Feature Learning on Point Sets in a Metric Space", Jun. 7, 2017, 14 pages.
Rahman, "Recent Advances in 3D Object Detection in the Era of Deep Neural Networks: A Survey", Nov. 2019, pp. 2947-2962.
Rumelhart, et al., "Learning Representations by Back-propagating Errors", Oct. 1986, pp. 533-536.
Schumann, et al., "Scene Understanding with Automotive Radar", IEEE Transactions on Intelligent Vehicles, vol. 5, No. 2, Jun. 2020, pp. 188-203.
Schumann, et al., "Semantic Segmentation on Radar Point Clouds", Jul. 2018, pp. 2179-2186.

\* cited by examiner

OBJECT DETECTION IN A VEHICLE

INCORPORATION BY REFERENCE

This application claims priority to European Patent Application Number EP21195945.7, filed Sep. 10, 2021, the disclosure of which is incorporated by reference in its entirety.

BACKGROUND

Digital imaging devices, such as digital cameras and radar devices, are used in automotive applications to detect objects in the path of the vehicle.

Current radar methods for detection of objects exploit temporal information via tracking algorithms, like Kalman filtering, to filter predictions in the time domain. However, these algorithms cannot leverage this information to make predictions but just to filter them out.

Accordingly, there is a need for an improved method and system for object detection in a vehicle.

SUMMARY

The present disclosure provides a computer-implemented method, a computer system, a non-transitory computer-readable medium, and a vehicle for object detection in a vehicle. In particular, the present disclosure relates to object detection in the driveway of a vehicle. Example embodiments are given in the claims, the description, and the drawings.

In one aspect, the present disclosure is directed at a computer-implemented method for object detection in a vehicle. Therein, the method comprises capturing current radar image data, the current radar image data comprising at least one current point cloud, the current point cloud comprising at least one current object point being related to an object, each current object point comprising spatial information related to the object. The method further comprises retrieving previous radar image data, the previous radar image data comprising at least one previous point cloud, the previous point cloud comprising at least one previous object point being related to the object, each previous object point comprising spatial information related to the object. The method further comprises concatenating the information from the current radar image data and the information from the previous radar image data to derive enhanced radar image data using a recurrent neural network.

The method according to the present disclosure comprises, in a first step, capturing radar image data, in particular by capturing a radar image using a radar device. The radar device may be part of the vehicle. The capturing time of the current radar image may also be referred to as t.

The captured current radar image comprises at least one current point cloud. Usually, the captured current radar image comprises two or more current point clouds. Therein, each current point cloud comprises at least one current object point. Typically, each current point cloud comprises multiple current object points.

Each current point cloud, and thus the at least one current object point being comprised by the current point cloud, relates to an object, in particular a physical object, like an obstacle or a pedestrian, typically in the vicinity of the vehicle, in particular in the driveway of the vehicle. The vehicle may in particular be a vehicle that is capable of autonomous driving.

Each current object point comprises spatial information being related to the object, in particular at the time t. In particular, the spatial information may comprise radar information like, for example, range and angle. Optionally, each current object point comprises additional information being related to the object, like associated features of the object being detected by the radar device.

In a next step, the method according to the present disclosure comprises retrieving previous radar image data. In particular, the previous radar image data may be retrieved from a memory or a storage device. Typically, the previous radar image data relate to a previously captured radar image by the same radar device of the vehicle. The capturing time of the previous radar image may also be referred to as $t-1$, which is before t. Typically, the capturing time of the previous radar image is directly before the capturing time of the current radar image, in particular, the frame immediately before the frame of the current radar image.

The previous radar image data is stored in a memory (e.g., a non-volatile memory or a random-access memory). The previous radar image is retrieved via a processor. Both, the memory and the processor may be embedded in the vehicle and/or in connection with the radar device.

Similar to the current radar image data, the previous radar image data comprises one or more previous point clouds, each previous point cloud comprising at least one previous object point being related to the same physical object in the vicinity of the vehicle. Therein, each previous object point comprises spatial information related to the object, in particular at the time $t-1$. Each previous object point also may comprise additional information being related to the object, like associated features of the object being detected by the radar device.

In a further step, the method according to the present disclosure comprises concatenating the information from the current radar image data and the information from the previous radar image data to derive enhanced radar image data. Concatenating, or combining, the information may also be described as merging the information to create an enhanced radar image, comprising the information from the current point in time and the previous point in time $t-1$.

Concatenating is performed via the processor by using a recurrent neural network, which is abbreviated as RNN. In particular, by using a recurrent neural network, the information from the current radar image is enriched or enhanced by the information from the previous radar image. Further, the RNN filters out erroneous information, in particular as present in the current radar image data.

In particular, the method according to the present disclosure achieves to extract a time-based knowledge from the input sequence of the radar device and merge it with spatial-related information. In particular, through the method according to the present disclosure predictions can be performed by not (only) using time-information.

Further, by operating at object level, the method according to the present disclosure solves the problem of learning temporal information from non-relevant data points. In particular, the method according to the present disclosure enables an RNN that is able to extract temporal-based information from radar point clouds on an object-level, employing the inner section of a neural network for object detection.

According to an embodiment, concatenating the information comprises compensating the ego movement of the vehicle. A compensation considers the movement of the vehicle between the current radar image capturing time t and the previous radar image capturing time t−1, for example by using odometry data of the vehicle.

The compensation of the ego vehicle has the effect that the information from the current radar image data and the information from the previous radar image data can be concatenated objectively.

According to an embodiment, concatenating the information comprises processing an object recognition algorithm on the current radar image data and/or the previous radar image data.

An object recognition algorithm may be employed on either one or both of the current radar image data and the previous radar image data.

According to an embodiment, concatenating the information comprises grouping each previous object point and each current object point. A grouping results in a clustering of the respective object points to enhance the object recognition. By using an RNN, any erroneously grouped object points are filtered out. The step of grouping typically is performed after the step of compensating the ego movement.

According to an embodiment, the previous radar image data comprises spatial information related to the object from two different points in time. In particular, the spatial information, and, additionally the additional information, in the previous radar image data comprises information related to the object from two or more different points, like, for example, from capturing times t−1, t−2, t−3, and t−4. In this way, a more robust object recognition is achieved.

According to an embodiment, the method further comprises updating the previous radar image data with the enhanced radar image data. In particular, updating may include adding the information from the current radar image data such that the previous radar image comprises information from capturing times t, t−1, t−2, t−3, and t−4. This updated previous radar image can then be used for object recognition for a future capturing time, like, for example, t+1.

According to an embodiment, updating the previous radar image data further comprises replacing previous radar image data with the enhanced radar image data. In particular, the oldest information t−4 may be deleted when updating the previous radar image data.

Thus, the information comprises only the most recent information and a small memory can be used.

In particular, using radar image data from only the latest four capturing times, a particularly well balance between memory usage and object detection preciseness is achieved.

In another aspect, the present disclosure is directed at a computer system, said computer system being configured to carry out several or all steps of the computer-implemented method described herein.

The computer system may comprise a processing unit, at least one memory unit, and at least one non-transitory data storage. The non-transitory data storage and/or the memory unit may comprise a computer program for instructing the computer to perform several or all steps or aspects of the computer-implemented method described herein.

In another aspect, the present disclosure is directed at a non-transitory computer-readable medium comprising instructions for carrying out several or all steps or aspects of the computer-implemented method described herein. The computer-readable medium may be configured as: an optical medium, such as a compact disc (CD) or a digital versatile disk (DVD); a magnetic medium, such as a hard disk drive (HDD); a solid state drive (SSD); a read-only memory (ROM), such as a flash memory; or the like. Furthermore, the computer-readable medium may be configured as a data storage that is accessible via a data connection, such as an internet connection. The computer-readable medium may, for example, be an online data repository or a cloud storage.

The present disclosure is also directed at a computer program for instructing a computer to perform several or all steps or aspects of the computer-implemented method described herein.

BRIEF DESCRIPTION OF THE DRAWINGS

Example embodiments and functions of the present disclosure are described herein in conjunction with the following drawings, shown schematically in.

DETAILED DESCRIPTION

Figure 1:
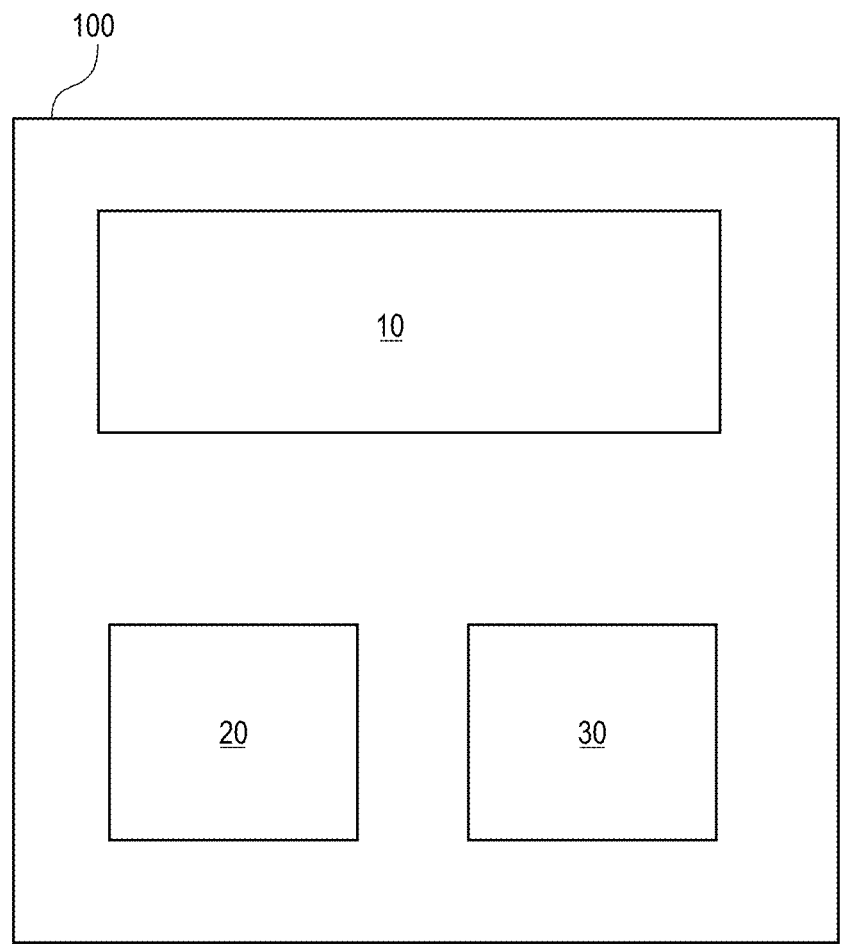
FIG. 1 illustrates a block diagram of an embodiment of a system according to the present disclosure.

In the figures, the same reference numerals denote same or similar features.

FIG. 1 depicts a block diagram of an embodiment of a system 100 according to the present disclosure. The system 100 comprises a radar device 10, a processor 20, and a memory 30.

The system 100 is adapted, via the radar device, the processor, and the memory 30 to carry out a method, in particular, a computer-implemented method for object detection in a vehicle (not shown).

Therein, the radar device 10 is adapted to capture current radar image data, wherein the current radar image data comprise at least one current point cloud, the current point cloud comprising at least one current object point being related to an object, each current object point comprising spatial information related to the object.

The processor 20 is adapted to retrieve previous radar image data from the memory 30, wherein the previous radar image data comprising at least one previous point cloud, the previous point cloud comprising at least one previous object point being related to the object, each previous object point comprising spatial information related to the object.

The processor 20 may also adapted to concatenate the information from the current radar image data and the information from the previous radar image data to derive enhanced radar image data using a recurrent neural network.

The processor 20 may also adapted to compensate the ego movement of the vehicle.

The processor 20 may further adapted to process an object recognition algorithm on the current radar image data and/or the previous radar image data.

The processor 20 may also adapted to group each previous object point and each current object point.

Therein, the previous radar image data may comprise spatial information related to the object from two different points in time.

The processor 20 may also be adapted to update the previous radar image data with the enhanced radar image data.

Therein, the processor 20 may further be adapted to replace previous radar image data with the enhanced radar image data.

Figure 2:
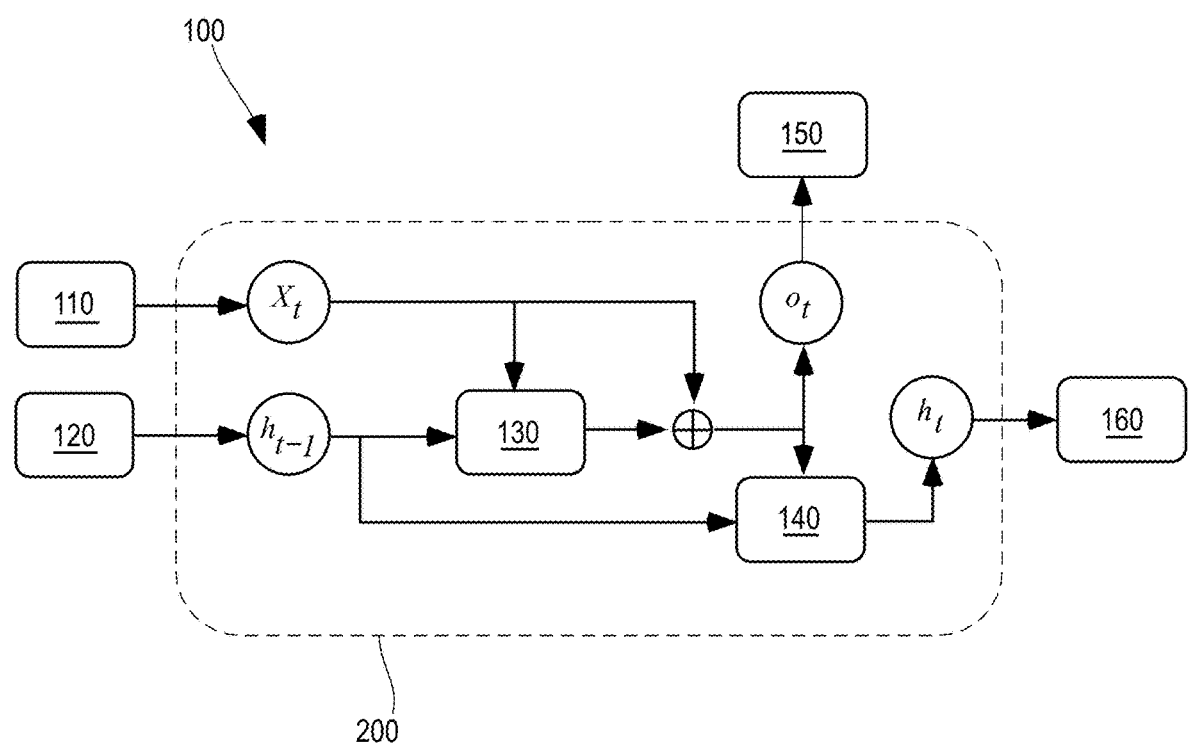
FIG. 2 illustrates a flow chart of an embodiment of a system according to the present disclosure.

FIG. 2 depicts a flow chart of an embodiment of the system 100 according to the present disclosure as shown in FIG. 1. The system 100 has the inputs of the current radar image data 110 and the previous radar image data 120.

The current radar image data 110 comprises an input list of multiple current object points of a current radar image data being captured at the time t. Therein, the current object points are related to at least one object in the vicinity of a vehicle. In this list, each current object point comprises spatial information related to the object and additional information being related to the object.

The previous radar image data 120 comprises previous object points being related to the same object, each previous object point comprising spatial information related to the object and additional information being related to the object. The previous object points in the previous image data 120 relates a capturing time before capturing time t, i.e., capturing time t−1. The previous radar image data 120 may also described as hidden state data. The previous radar image data 120 may also comprise predictions of the object.

The current radar image data 110 is being fed to a recurrent neural network, RNN, 200 as input $x_t$ and the previous radar image data 120 is fed to the RNN 200 as input $h_{t-1}$. In processing module 130, the current radar image data 110 and the previous radar image data 120 are grouped and processed for object detection.

The grouped and processed current radar image data 110 and previous radar image data 120 are then concatenated to derive enhanced radar image data as output $o_t$. This output $o_t$ is then processed by an update module 140 to update the previous radar image data of the current capturing time t as $h_t$.

The RNN 200 then puts out the enhanced radar image data into output 150 and the updated previous radar image data as new previous radar image data 160. The output can then be further processed with, for example, fully connected layers to refine the object positions and estimate box parameters.

Figure 3:
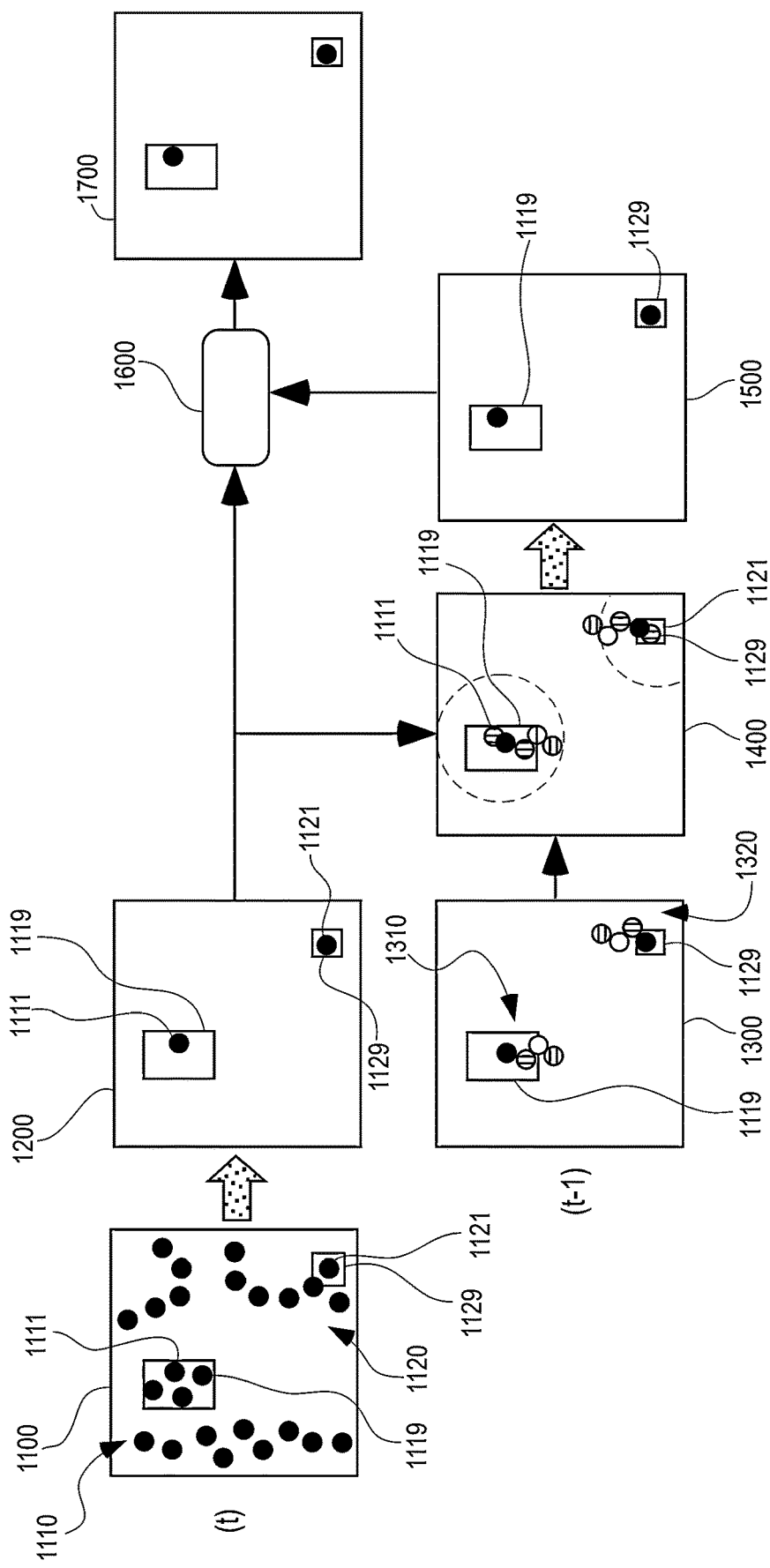
FIG. 3 illustrates a flow chart of an embodiment of a method according to the present disclosure.

FIG. 3 depicts a flow chart of an embodiment of a method 1000 being carried out by the system 100 as shown in FIG. 1 and FIG. 2, in particular by the RNN 200 as shown in FIG. 2, according to the present disclosure.

In a first step 1100, the RNN receives the captured current radar image data wherein the current radar image data comprises multiple current point clouds, out of which a first point cloud 1110 and a second point cloud 1120 is highlighted for illustrative purposes.

The current point clouds 1110 and 1120 each include multiple current object points 1111, 1121, wherein a first current object point 1111 is related to a first object 1119, and a second current object point 1121 is related to a second object 1129. Therein, each current object point 1111, 1121 comprises spatial information related to the respective object 1110, 1120.

In a second step 1200, an object prediction algorithm is carried out on the current object points 1111, 1121 to detect two objects 1119 and 1129.

In a further step 1300, previous radar image data is retrieved, wherein the previous radar image data comprises a first previous point cloud 1310 and a second previous point cloud 1320. Therein, the first and second previous point clouds 1310, 1320, respectively comprise previous object points 1311, 1312, being related to the same two objects 1119 and 1129, wherein each previous object point comprising spatial information related to the object. In this particular shown example, the first and second previous point clouds 1310 and 1320 comprise previous object points being related to four previous instances of time before the current capturing time t.

In a further step 1400, the ego movement of a vehicle is compensated and the first and second current object point 1111 and 1121 of the first and second object 1119 and 1129 are grouped together with the multiple previous object points.

In a next step 1500, an object prediction algorithm is carried out on the grouped information from step 1400, to detect and/or verify the first and second objects 1119 and 1129.

In a further step 1600, the object recognition information from step 1200 and the object recognition information from step 1500 are concatenated to derive enhanced radar image data. In particular, while spatial features are provided from the object recognition information from step 1200, temporal features are provided from step 1500, thus enhancing the radar image data, which are shown in step 1700.

In particular, embodiments of the method and system as disclosed herein has been purposefully designed for radar data. Specifically, to counter the sparsity of radar point clouds, embodiments of the method and system as disclosed herein store in the state point clouds from several previous captures rather than just the latest one.

This represents a key aspect towards the applicability of RNN to radar. Indeed, radar generally alternates transmissions of signals with different settings, therefore an object can appear differently across different frames.

Additionally, embodiments of the method and system as disclosed herein do not use the features of the current object points nor the absolute locations of the points in the state to extract time-related features. This results in lower computational costs. However, this does not result in information loss, as spatial and temporal signatures are later concatenated.

Further, the embodiments of the method and system as disclosed herein operate at object-level. This is a critical aspect, as it enables to learn time-relevant information from object detected in the past—and the corresponding signatures—rather than abstract point locations. Indeed, at lower-levels, the RNN is more sensitive to the sensor-perspective of the object, which might change across frames.

For example, as the result of occlusion, the object might generate a fewer amount of point reflections. On the other hand, provided that the object has enough point-measurement to enable its detection, past object predictions yield a smoother, less-noisy time-series data, thus facilitating the extraction of temporal information.

When performing environment-perception (e.g., object-recognition), temporal information is extremely important. Indeed, objects like vehicles, pedestrians, or buildings do not disappear suddenly. Therefore, equipping an object detection system with an RNN-like module produces a considerable increase in performance.

However, radar image point clouds are not well-posed for RNNs. Besides the lack of structure, they provide low point-density. Moreover, radar uses different signals across time to sense the environment, therefore, from the sensor-perspective, information might not be continuous or homogenous in time. For these reasons, LIDAR-based RNN solutions struggle to generalize to radar data.

The embodiments of the method and system as disclosed herein has been designed to address the characteristics of the radar sensor. By operating at object-level, it provides the advantage of dealing with physical objects, thus limiting the data-diversity in time.

LIST OF REFERENCE CHARACTERS FOR THE ELEMENTS IN THE DRAWINGS

The following is a list of the certain items in the drawings, in numerical order. Items not listed in the list may nonetheless be part of a given embodiment. For better legibility of the text, a given reference character may be recited near some, but not all, recitations of the referenced item in the text. The same reference number may be used with reference to different examples or different instances of a given item.

10 radar device
20 processor
30 memory
100 system
110 current radar image data
120 previous radar image data
130 processing module
140 update module
150 output of recurrent neural network
160 new previous radar image data
200 recurrent neural network
1000 method
1100 method step
1110 first current point cloud
1111 first current object point
1119 first object
1120 second current point cloud
1121 second current object point
1129 second object
1200 method step
1300 method step
1310 first previous point cloud
1311 first previous object point
1320 second previous point cloud
1321 second previous object point
1400 method step
1500 method step
1600 method step
1700 method step
$h_t$ output
$h_{t-1}$ input
$o_t$ output
$x_t$ input

What is claimed is:

1. A method comprising:
capturing current radar image data, the current radar image data comprising at least one current point cloud, the current point cloud comprising at least one current object point being related to an object, each current object point comprising spatial information related to the object;
retrieving previous radar image data from a memory, the previous radar image data comprising at least one previous point cloud, the previous point cloud comprising at least one previous object point being related to the object, each previous object point comprising spatial information related to the object;
compensating the ego movement of the current point cloud and, thereafter, grouping each previous object point in the previous point cloud with each current object point in the current point cloud;
processing an object prediction algorithm on the grouped object points to verify the object; and
concatenating the grouped and processed radar image data to derive enhanced radar image data using a recurrent neural network, wherein erroneously grouped object points are filtered out by the recurrent neural network.

2. The method of claim 1, wherein the concatenating comprises processing an object recognition algorithm on at least one of the current radar image data or the previous radar image data.

3. The method of claim 1, wherein the previous radar image data comprises spatial information related to the object from two different points in time.

4. The method of claim 1, wherein the method further comprises updating the previous radar image data with the enhanced radar image data.

5. The method of claim 4, wherein updating the previous radar image data further comprises replacing previous radar image data with the enhanced radar image data.

6. A vehicle comprising:
at least one radar device configured to:
capture current radar image data, the current radar image data comprising at least one current point cloud, the current point cloud comprising at least one current object point being related to an object, each current object point comprising spatial information related to the object; and
at least one processor configured to:
retrieve previous radar image data from a memory, the previous radar image data comprising at least one previous point cloud, the previous point cloud comprising at least one previous object point being related to the object, each previous object point comprising spatial information related to the object;
compensate the ego movement of the current point cloud and, thereafter, group each previous object point in the previous point cloud with each current object point in the current point cloud;
process an object prediction algorithm on the grouped object points to verify the object; and
concatenate the grouped and processed radar image data to derive enhanced radar image data using a recurrent neural network, wherein erroneously grouped object points are filtered out by the recurrent neural network.

7. The vehicle of claim 6, wherein the concatenation comprises processing an object recognition algorithm on at least one of the current radar image data or the previous radar image data.

8. The vehicle of claim 6, wherein the previous radar image data comprises spatial information related to the object from two different points in time.

9. The vehicle of claim 6, wherein the at least one processor is further configured to update the previous radar image data with the enhanced radar image data.

10. The vehicle of claim 9, wherein the at least one processor is further configured to replace, during the update of the previous radar image data, previous radar image data with the enhanced radar image data.

11. A non-transitory computer-readable storage medium storing one or more programs, the one or more programs comprising instructions, which when executed by one or more processors, cause a computer system to perform operations comprising:
capture, via a radar device, current radar image data, the current radar image data comprising at least one current point cloud, the current point cloud comprising at least one current object point being related to an object, each current object point comprising spatial information related to the object;
retrieve previous radar image data from a memory, the previous radar image data comprising at least one previous point cloud, the previous point cloud comprising at least one previous object point being related to the object, each previous object point comprising spatial information related to the object;

compensate the ego movement of the current point cloud and, thereafter, group each previous object point in the previous point cloud with each current object point in the current point cloud;

process an object prediction algorithm on the grouped object points to verify the object; and concatenate the grouped and processed radar image data to derive enhanced radar image data using a recurrent neural network, wherein erroneously grouped object points are filtered out by the recurrent neural network.

12. The non-transitory computer-readable storage medium of claim 11, wherein the concatenation comprises processing an object recognition algorithm on the current radar image data and/or the previous radar image data.

13. The non-transitory computer-readable storage medium of claim 11, wherein the previous radar image data comprises spatial information related to the object from two different points in time.

14. The non-transitory computer-readable storage medium of claim 11, wherein the one or more processors is further configured to update the previous radar image data with the enhanced radar image data.

* * * * *